United States Patent [19]
Burghart et al.

[11] Patent Number: 4,950,124
[45] Date of Patent: Aug. 21, 1990

[54] TRUCK AND/OR TRAILER WITH A CLOSED BOX BODY

[75] Inventors: Hermann Burghart, Lauingen; Alois Kühbeck, Dillingen, both of Fed. Rep. of Germany

[73] Assignee: Alois Kühbeck GmbH, Dillingen-Fristigen, Fed. Rep. of Germany

[21] Appl. No.: 377,885

[22] Filed: Jul. 10, 1989

[30] Foreign Application Priority Data

Jul. 13, 1988 [DE] Fed. Rep. of Germany ....... 3823639

[51] Int. Cl.⁵ ............................ B60R 3/00; B60P 3/20
[52] U.S. Cl. ........................................ 414/537; 296/50
[58] Field of Search ........................ 414/537, 538, 921; 296/50; 14/71.1

[56] References Cited

U.S. PATENT DOCUMENTS

| | | | |
|---|---|---|---|
| 456,601 | 7/1891 | Sherwin | 14/71.1 |
| 936,918 | 7/1910 | Miller | 414/537 X |
| 3,319,811 | 5/1967 | Martin, Jr. | 414/537 |
| 3,642,156 | 2/1972 | Stenson | 414/537 |
| 3,861,739 | 1/1975 | Kinney | 414/537 X |
| 3,972,428 | 8/1976 | Love, Jr. et al. | 414/537 |
| 4,657,233 | 4/1987 | Vroom | 414/537 X |
| 4,874,284 | 10/1989 | New, Jr. | 414/537 |
| 4,878,800 | 11/1989 | Dell | 414/537 X |

Primary Examiner—David A. Bucci
Attorney, Agent, or Firm—Horst M. Kasper

[57] ABSTRACT

A truck or, respectively, truck trailer, in particular with a closed box body, possibly provided with thermal insulation, and a door (3) disposed at the box body and pivotable around hinges with vertical pivot axes, where the hinges are attached at the box body (1), wherein a pivot arm (7), with its pivot hinge (6), extending horizontally over two sides (3a, 3b) below the door (3) at the box body (1) or, respectively, at the vehicle frame (2) is disposed such that the rotation axes (6a) of the pivot arm (7) are aligned with the pivot axes (4a) of the door hinge brackets (4), and where the pivot arm (7) is connectable at its free end (7a) by a bolting device (8) to the box body (1) or, respectively, the vehicle frame (2), and where a ramp (10) or, respectively, (34) is disposed at the pivot arm (7), where the ramp is pivoted around a pivot hinge device (9) and mountable and demountable by way of a bolting device (11) at the door (3), and where this ramp is narrower than the door (3).

17 Claims, 6 Drawing Sheets

TRUCK AND/OR TRAILER WITH A CLOSED BOX BODY

BACKGROUND OF THE INVENTION

1. Field of the Invention

The invention relates to a truck or, respectively, truck trailer, in particular with a closed box body, possibly furnished with a thermal insulation and a door, disposed at the box body and pivotable on hinges with vertical pivot axes.

2. Brief Description of the Background of the Invention Including Prior Art

In general, narrow pull down, or fold-down doors are provided for refrigerator cars or trucks for supplying a number of receivers with foodstuffs and beverages, in order to prevent a larger heat influence when the doors are open. Unloading assistance means, such as side walls, which can be folded down and lowered to the ground by way of hydraulic link rods, which allow a driving onto the platform with carts or carriages for the loading and unloading and for the transporting of food crates to the receivers, can in general not be used. Furthermore, such devices are complicated and consequently expensive and their mode of operation would require a longer and, consequently, undesired keeping open of the truck box body.

As it is known from refrigerator cars or trucks, ramps are employed which furnish an inclined plane. These ramps have a substantial length corresponding to the inclination angle and comprise, consequently, individual parts which have to be assembled, and which have to be stored somewhere in the vehicle. The mounting and demounting of the ramps, consequently, is very cumbersome and time-consuming. Apart from this, the accident danger is substantial during the handling of such ramps. Inadvertency during the connecting of the individual parts as well as wear of the individual parts can lead to easy damaging of the ramps, and these ramps can, based on the aforesaid method of use or on an unsuitable positioning of the ramps, experience an unintentional change in their positioning relative to the door threshold.

SUMMARY OF THE INVENTION

1. Purposes of the Invention

It is an object of the invention to provide a ramp which is safe against accidents.

It is a further object of the invention to provide a ramp for a truck box body which can be made available and which can be stored in a very short time.

It is yet a further object of the invention to provide a ramp for a truck box body which is simpler to handle at any location.

These and other objects and advantages of the present invention will become evident from the description which follows.

2. Brief Description of the Invention

The present invention provides for a vehicle of a closed box body attached to a vehicle frame comprising hinges attached to the box body. A door is attached to the box body via said hinges and is pivotable around hinges with vertical pivot axes. A pivot hinge is attached to the box body. A pivot arm is attached to the pivot hinge extending horizontally over two sides below the door at the vehicle and disposed such that the rotation axes of the pivot arm are aligned with the pivot axes of the door hinge. The pivot arm is connectable at its free end by a bolting device to the vehicle. A ramp is disposed at the pivot arm. Said ramp is pivoted around a pivot hinge device and mountable and demountable by way of a bolting device at the door. This ramp is narrower than the door.

An inner ramp part can be connected to the pivot arm. An outer ramp part can be connected to the inner ramp part. The inner ramp part and the outer ramp part together can form the ramp. Pivot hinges can be furnished at side pieces of the ramp parts. The outer ramp part can be pivoted outwardly and inwardly at the inner ramp part around said pivot hinges.

The two ramp parts can be comprised of floors. Said floors can be fixedly supported on profiled side pieces. The outer ramp part can be wider than the inner ramp part such that when the outer ramp part is pivoted inwardly, it can surround the inner ramp part in such a way that the side pieces of the two ramp parts can be disposed next to each other approximately on a plane.

The stop device, disposed between the two ramp parts, can become effective in the outwardly pivoted position of the ramp parts.

The ramp can comprise U-shaped side pieces with open sides and upper arms. The open sides of the U-shaped side pieces can be directed inwardly. Floors can be attached at the upper arms of the U-shaped side pieces. The U-shapes of the outer ramp part and of the floor can be dimensioned such that the inner ramp part can be slid back and forth in the outer ramp part like a telescope.

A floor support, disposed at one of the ramp parts, can be pivoted inwardly and outwardly under its own weight. The floor support can be pivoted around pivot hinges of the ramps.

At the pivot hinge device, at least one straight or helically wound torsion spring or the like can be tensioned between the journal of the tension spring or the bearing block and the pivot bearing bush. The bearing block can be connected to the journal. Bearing bushes of the pivot hinge device can be connected to side pieces of an inner ramp. The bearing bushes can be rigidly connected to each other via a pipe and supported at bearing blocks or, respectively, at the journal.

The left end of the torsion spring can be tensioned at a tension ring, exhibiting tension holes and supported between the bearing bush and the left bearing block, and the right end of the torsion spring can be tensioned at the right bearing block.

The ramp of the present invention is solidly connected to the vehicle and can be brought very quickly into an operating position or, respectively, into a storage position. The ramp is associated with the advantage that it does not require an additional storage area. Furthermore, an unintentional change of the positioning of the ramp relative to the floor of the truck box body is excluded, and thus, accidents resulting from such a positional change are excluded. The door can be actuated from the ground without interference by the ramp. A low wear, and thus a decreased danger, is associated with the ramp of the present invention.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
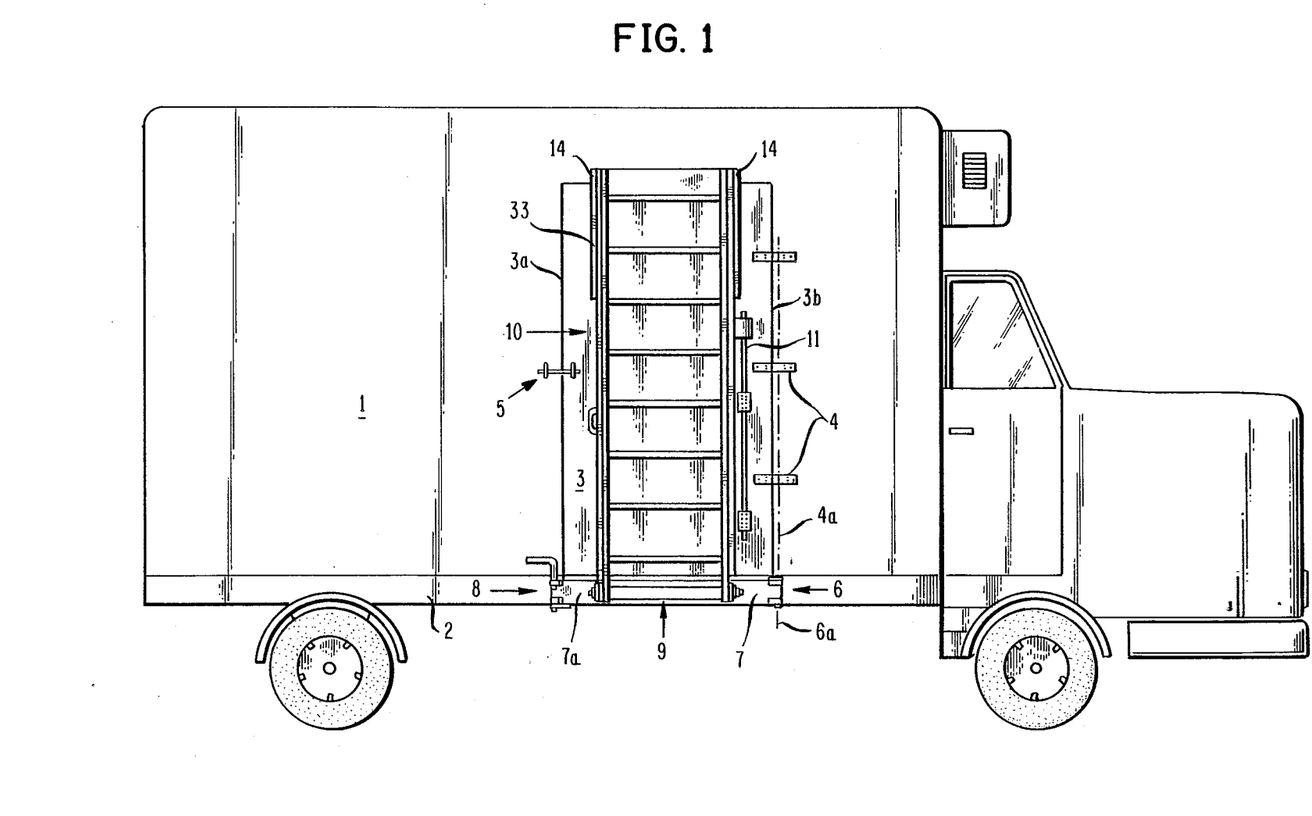
FIG. 1 is a schematic side view of a truck with a ramp according to the invention.
Figure 5:
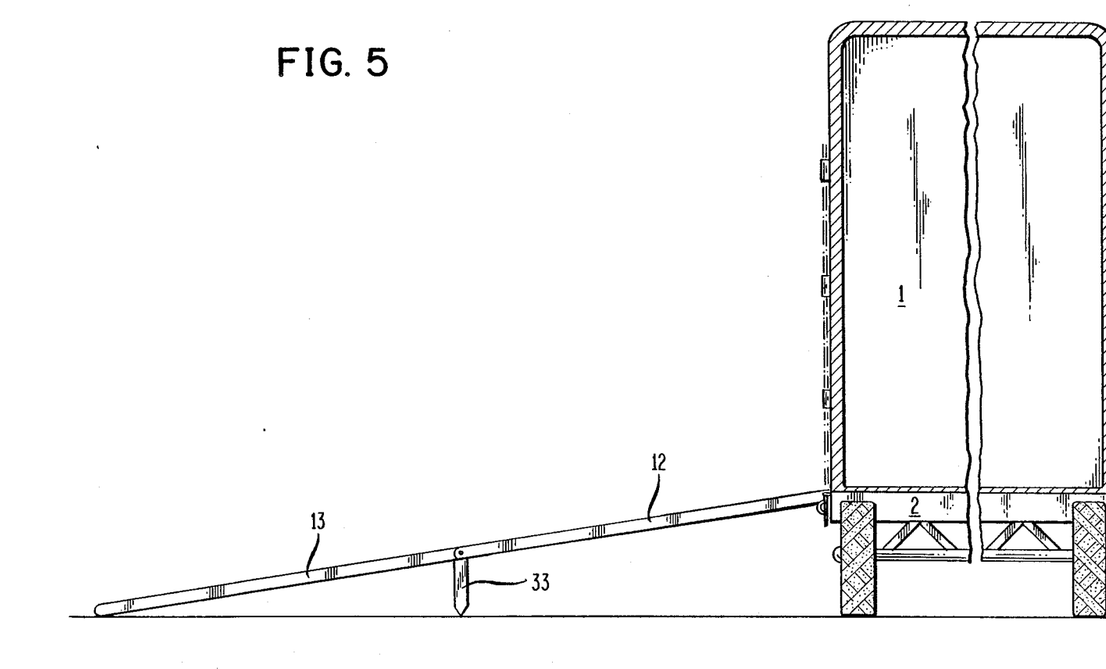
FIG. 5 illustrates schematically, in a rear view, two position of the ramp.
Figure 6:
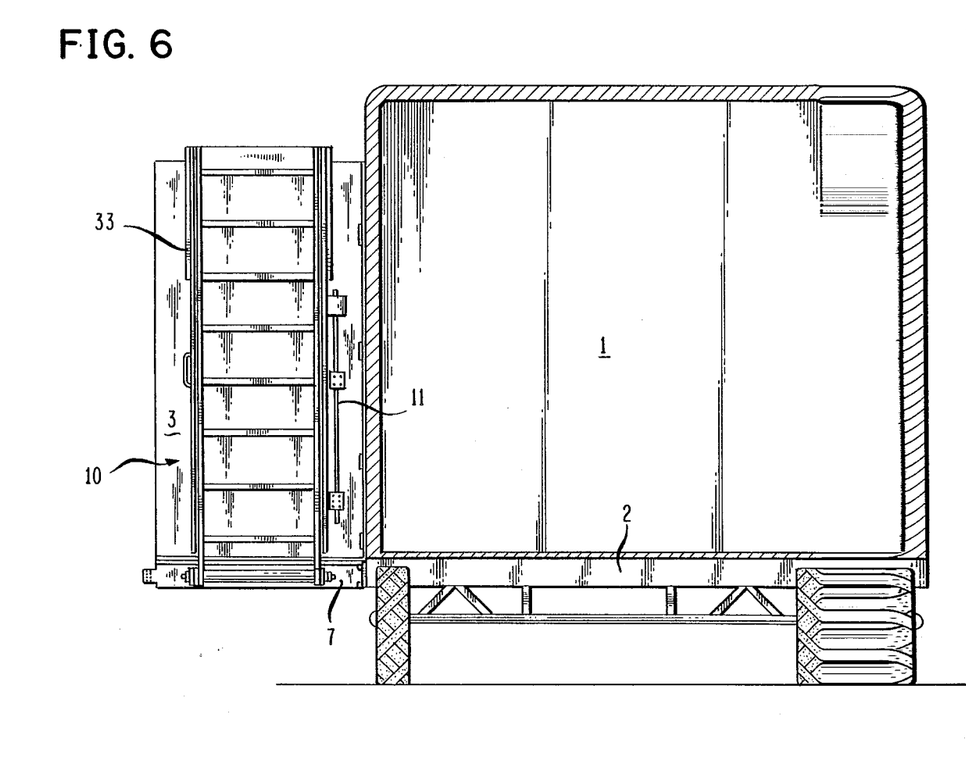
FIG. 6 illustrates schematically a rear elevational view of the truck, according to FIG. 5, with an open door.

A closed box body construction is designated with reference numeral 1 in FIGS. 1, 5, and 6. A motor vehicle frame of a truck is designated with reference numeral 2. A door 3 is attached at the box body 1 at door hinge brackets 4 and has a door closure mechanism 5.

A pivot arm 7, pivotable around a rotary hinge 6 and extending laterally over the longitudinal sides 3a, 3b of the door 3, is disposed below the door 3 at the vehicle frame 2. As illustrated in FIG. 1, the rotation axis 6a of the rotary hinge 6 is aligned with the pivot axes 4a of the door hinge brackets 4. The pivot arm 7 is connectable at its free end 7a by way of a bolting device 8 with the vehicle frame 2. As can be recognized from the enlarged illustrations of FIGS. 2 and 3, a ramp 10, pivotable a pivot hinge device 9, is disposed at the pivot arm 7. This ramp 10 is connected in the upwardly pivoted storage position by a bolting device 11 to the door 3. As can be recognized from the figures, the ramp 10 includes an inner ramp part 12 and an outer ramp part 13. According to the embodiment of FIGS. 1 to 3, as well as FIGS. 5 and 6, the outer ramp part 13 is attached at the inner ramp part 12 with rotary hinges 14 and the outer ramp part 13 can be pivoted inwardly and outwardly around the inner ramp part 12. The two ramp parts 12, 13 are essentially made of profiled side pieces 15, and floors 16 are welded to the side pieces 15. As can be recognized, in case of the illustrated embodiment, the outer ramp part 13 is wider as compared to the inner ramp part 12, such that the side pieces 15 are disposed next to each other in case of an inwardly pivoted position.

Figure 4:
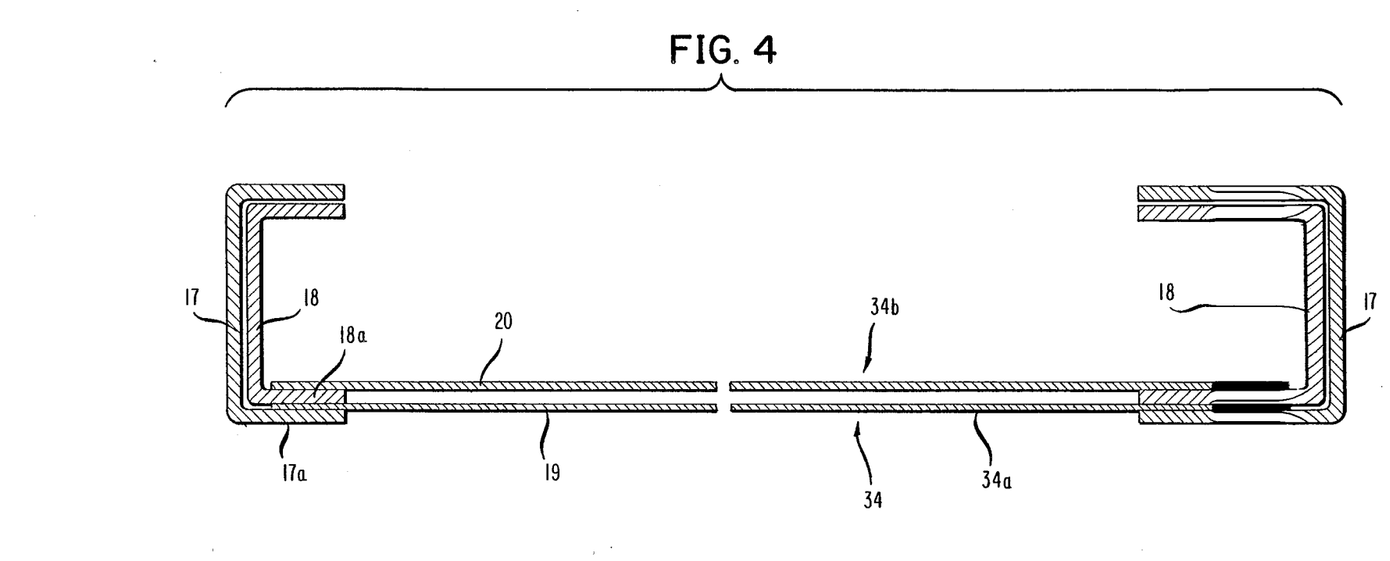
FIG. 4 is a cross-sectional view of a modified embodiment of the ramp.

The side pieces 17, 18 of a ramp 34 comprise, according to a modified embodiment illustrated in FIG. 4, inwardly open U-profiles, where floors 19 and 20 are welded to the lower arms 17a and 18a of the U-profiles. As can be recognized, the side pieces 17 and the floors 20 are dimensioned such that, in this case, the inner ramp part 34b can be slid like a telecope in the outer ramp part 34a into a slid-in storage position and into a drawn-out operating position.

Figure 2:
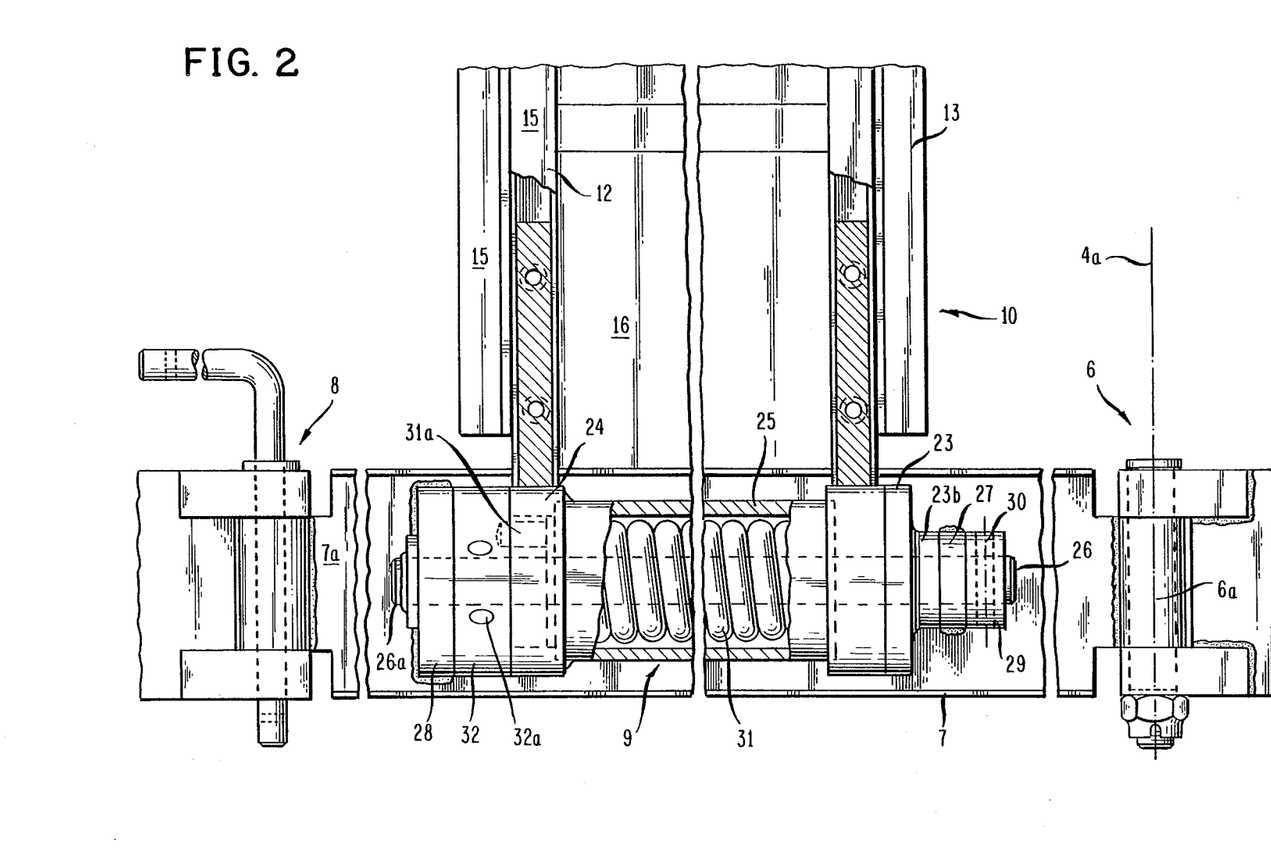
FIG. 2 is an enlarged view of the ramp of the embodiment of FIG. 1.
Figure 3:
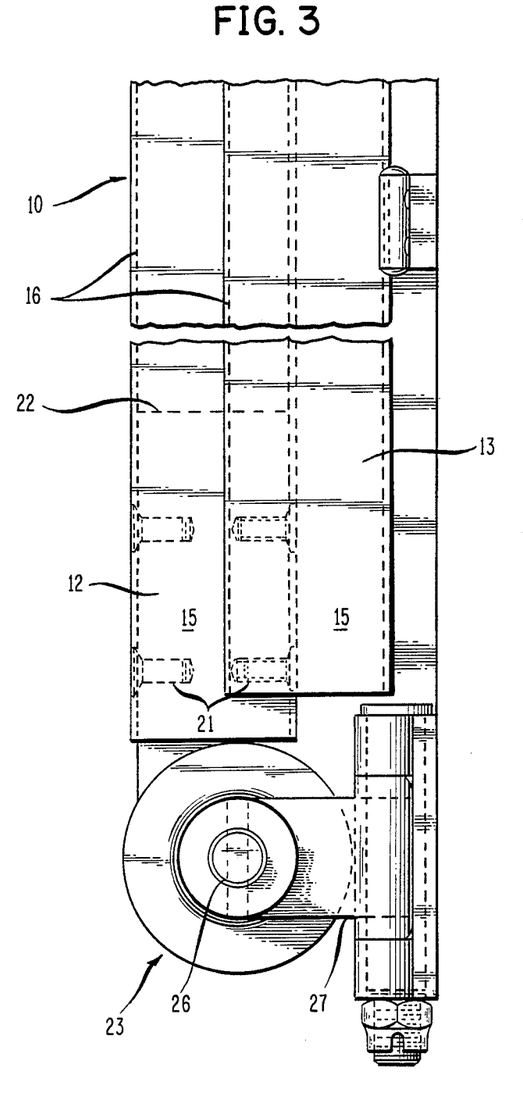
FIG. 3 illustrates the ramp according to FIG. 2 in a side view.

The inner ramp part 12, as illustrated in FIGS. 2 and 3, is connected to bearing bushes 23, 24 of the pivot hinge device 9 of the above-described ramp 10, by tongues 22 inserted into the side pieces 15 of the ramp and attached by screws 21.

A pipe 25 rigidly connects together the bearing bushes 23 and 24. The bearing bush 23 is supported with a narrowed bearing part 23b at a journal 26, penetrating centrally the pivot hinge device 9. The journal 26, in turn, is supported at a bearing block 27 at this bearing side. The journal 26, exhibiting a collar 26a on the other bearing side, is supported in this case in a bearing block 28, welded to the pivot arm 7, where the journal 26 is inserted through the bearing block 28. The journal 26 is attached at an outer bearing part 29 by a cotter pin 30.

A torsion spring 31 is disposed in the pipe 25 and is supported by parts, not illustrated in detail. The left end 31a of the torsion spring is tensioned by a tension ring 32, pivotably disposed at a step seat, not illustrated, at the bearing bush 24. The tensioning of the right end of the torsion spring 31 at the bearing block 27 is not illustrated.

The torsion spring 31 is pretensioned by rotation of the tension ring 32 with the aid of the holes 32a and its following fixing in position at the bearing bush 24 by a screw, not illustrated. With the support of the restoring force of the torsion spring 31, the swinging-in and swinging-out of the ramp 10 is facilitated in a simpler way.

The ramp 10 is completely pivoted down after release of the bolting device 11 illustrated in FIG. 1. A floor support 33, attached at the pivot hinges 14, is rotated into the position illustrated in FIG. 5. Thereby, the outer ramp part 13 is swung out toward the ground. The swinging-out of the floor support 33 can be limited by stops, not illustrated here.

The door 3 can be opened without difficulties, as illustrated in FIG. 6, where the ramp 10 is pivoted inward and is bolted with the door 3, after release of the bolting device 8, as shown in FIG. 6, such that the box body can be entered without use of the ramp 10 or where one can reach the adjoining floor of the truck box body directly from a spatially fixed ramp.

The ramp can be placed on the side or, alternatively, at the rear part of the box body. The total length of the ramp can be from about 2.5 to 3.5 times the width of the truck. The length of the ramp can be from about 1.6 to 1.8 times the height of the box body of the truck. The ramp is preferably bolted at the ramp and at the door by a rod passing through hinges.

It is possible that the door is furnished with a recess such that the ramp can be placed into said recess and does not protrude on the outside of the truck. The ramp can be furnished on its bottom side with steps. This assembly of the ramp from the truck in such case would allow to use the ramp as a ladder. The pivot arm 7 has to be supported by the pivot hinge 6 such that it is capable of supporting the full load of the ladder. The pivot arm 7 preferably should be capable of rotating and swinging together with the door. Consequently, the hinge axis of the pivot arm 7 and of the door should be coaxial. The width of the ramp can be from about 4 to 6 times the yoke part of the U-shaped side piece 17. Preferably the thickness of the U-section is from about 2 to 4 times the thickness of the flat ramp part. The length of the arms of the U section can be from about 0.3 to 1 times, and preferably between 0.4 and 0.6 times the length of the yoke section of the U.

The floor support 33 can be hinged at the same hinge which is employed to hinge the ramp part 13 to the ramp part 12. Stops can be provided which prevent the ramp part 13 and the floor support 33 from swinging out further than desired.

Preferably, the torsion spring 31 surrounds the journal 26 in a helical shape. The pipe 25 covers the torsion spring 31 against the outside. The torsion spring 31 is fixed on one side relative to the position of the axle and, on the second side, moved via its attachment together with the move of the ramp part 12. The hinge section 6 of the pivot arm 7 is preferably provided by a cylindrical rod which can be removed for simple demounting of the pivot arm 7 together with the ramp. This allows easy substitution of the ramp for service and maintainance purposes. The journal 26 has an axis which is disposed perpendicular to the hinge axis 6. Normally, the hinge axis of the hinge of the pivot arm 7 will be disposed vertically and the axis of the journal 26 will be disposed within a horizontal plane. This allows the ramp to swing around two axes, disposed perpendicular, i.e. the journal 26 and the axis of the hinge of the pivot arm 7. Preferably, the hinge axis of the pivot arm 7 is mounted to the frame of the box body or to the frame of the carriage supporting the box body. The door is preferably disposed such that its lower section is above the ramp upper end, at the time when the ramp is in its extended operating position. If desired, the pivot arm can be formed in its two end supports in a symmetrical fashion such that it is hinged in an approximately similar fashion on both sides with the only difference that the hinge is screwed or otherwise tied in position, whereas the other hinge can be removed for moving the ramp together with the door. Thus, the construction allows to use the door together with the ramp in operating position or without the ramp reaching operating position, as desired. It is further possible to provide snap-in features which allow the ramp to snap into its non-operating rest position at the door.

It will be understood that each of the elements described above, or two or more together, may also find a useful application in other types of box body systems differing from the types described above.

While the invention has been illustrated and described as embodied in the context of a box body for trucks and truck trailers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A vehicle of a closed box body attached to a vehicle frame comprising
   hinges attached to the box body;
   a door attached to the box body via said hinges and pivotable around hinges with vertical pivot axes;
   a pivot hinge attached to the box body;
   a pivot arm attached to the pivot hinge extending horizontally over two sides below the door on the vehicle and disposed such that a rotation axis of the pivot arm is aligned with the pivot axes of the door hinge, and where the pivot arm is connectable at its free end by a bolting device to the vehicle;
   a ramp disposed at the pivot arm, where said ramp is pivoted around a pivot hinge device and mountable and demountable to the door by way of a bolting device on the door, and where the ramp is narrower than the door.

2. The vehicle according to claim 1, comprising
   an inner ramp part connected to the pivot arm;
   an outer ramp part, connected to the inner ramp part, where the inner ramp part and the outer ramp part together form the ramp;
   pivot hinges furnished at side pieces of the ramp parts, wherein the outer ramp part can be pivoted outwardly and inwardly to the inner ramp part around said pivot hinges.

3. The vehicle according to claim 2, wherein the two ramp parts are comprised of floors, which floors are fixedly supported on profiled side pieces, wherein the outer ramp part is wider than the inner ramp part such that when the outer ramp part is pivoted inwardly, it surrounds the inner ramp part in such a way that the side pieces of the two ramp parts are disposed next to each other approximately on a plane.

4. The vehicle according to claim 2, wherein
   the ramp comprises U-shaped side pieces with open sides and lower arms,
   where the open sides of the U-shaped side pieces are directed inwardly, and where floors are attached at the lower arms of the U-shaped side pieces, and wherein the U-shapes of the outer ramp part are dimensioned such that the inner ramp part can be telescopically slid back and forth in the outer ramp part.

5. The vehicle according to claim 2, comprising
   a floor support, where the floor support, disposed at one of the ramp parts, can be pivoted inwardly and outwardly under its own weight.

6. Vehicle according to claim 1, further comprising
   a torsion spring,
   a pivot hinge device,
   a journal,
   a bearing block
   pivot bearing bushes,
   wherein at the pivot hinge device torsion spring is tensioned between the bearing block and a pivot bearing bush, and wherein the bearing block is connected to the journal, and
   wherein the bearing bushes are connected to side pieces of an inner ramp, and where the bearing bushes are rigidly connected to each other via a pipe and supported at bearing blocks or, respectively, at the journal.

7. The vehicle according to claim 1, comprising
   a tension ring with tension holes, where a left end of a torsion spring is tensioned at a tension ring exhibiting tension holes and supported between a bearing bush and a left bearing block, and a right end of the torsion spring is tensioned at a right bearing block.

8. A truck or, respectively, truck trailer, in particular with a closed box body, possibly provided with thermal insulation comprising a door (3) disposed on the box body and pivotable around hinges with vertical pivot axes, where the hinges are attached to the box body (1), a pivot arm (7) with a pivot hinge (6) extending horizontally over two sides (3a, 3b) below the door (3) on the box body (1) such that a rotation axis (6a) of the pivot arm (7) is aligned with the pivot axes (4a) of the door hinges (4), and where the pivot arm (7) is connectable at its free end (7a) by a bolting device (8) to the vehicle frame (2), and where a ramp (10 or, respectively, 34) is disposed on the pivot arm (7), where said ramp is pivoted around a pivot hinge device (9) and mountable and demountable to the door by way of a bolting device (11) on the door (3), and where the ramp is narrower than the door (3).

9. Truck according to claim 8, wherein
the ramp (10) is formed by two parts and comprises an inner ramp part (12), connected to the pivot arm (7), and an outer ramp part (13), connected to the inner ramp part (12).

10. Truck according to claim 8, wherein
the outer ramp part (13), can be pivoted inwardly and outwardly at the inner ramp part (12) around pivot hinges (14) furnished at side pieces (15) of the ramp parts.

11. Truck according to claim 9, wherein
the two ramp parts (12, 13) are comprised of floors (16) attached on profiled side pieces (15), where the outer ramp part (13) is wider than the inner ramp part (12) and is dimensioned such that the outer ramp part (13), in its inwardly pivoted position, surrounds the inner ramp part (12) such that the side pieces of the two ramp parts are disposed next to each other approximately in a plane.

12. Truck according to claim 9, wherein
the ramp (34) includes U-shaped side pieces (17, 18), where open sides of the sides pieces (17, 18) are directed inwardly and where floors (19) are attached at lower arms (17a, 18a) of the U-shaped side pieces (17, 18), where the U-shaped side pieces of the outer ramp part (34a) and a floor (19) are dimensioned such that the inner ramp part (34b) can be telescopically slid back and forth in the outer ramp part.

13. Truck according to claim 9, wherein
a floor support (33) is disposed on one of the ramp parts (12, 13), which floor support can possibly be pivoted out and pivoted in under its own weight.

14. Truck according to claim 13, wherein
the floor support (33) can be pivoted around pivot hinges (14) of the ramps (12, 13).

15. Truck according to claim 8, wherein
at least one torsion spring (31) is tensioned at the pivot hinge device (9) or between one bearing block (27), connected to the journal (26) and a pivot bearing bush (24).

16. Truck according to claim 8, wherein
the pivot hinge device (9) exhibits bearing bushes (23, 24) connected to side pieces (15) of an inner ramp part (12), which bearing bushes (23, 24) are rigidly connected to each other via a pipe (25) and are supported at bearing blocks (27, 28) or, respectively, at the journal (26).

17. Truck according to claim 15, wherein
the torsion spring (31), on the one hand, is tensioned with an end (31a) at a tension ring (32) exhibiting tension holes (32a) and supported between the bearing bush (24) and the bearing block (28) and, on the other hand, is tensioned with the second end at the bearing block (27).

* * * * *